United States Patent [19]

Matthys

[11] 4,448,385
[45] May 15, 1984

[54] STABLE ALIGNMENT MECHANISM FOR LASER MIRRORS

[75] Inventor: Robert J. Matthys, Minneapolis, Minn.

[73] Assignee: Honeywell Inc., Minneapolis, Minn.

[21] Appl. No.: 262,736

[22] Filed: May 12, 1981

[51] Int. Cl.³ .............................................. F16M 13/00
[52] U.S. Cl. ................................... 248/476; 248/179; 248/274; 308/2 A
[58] Field of Search ............... 308/2 A; 248/178, 179, 248/180, 274, 476

[56] References Cited

U.S. PATENT DOCUMENTS

| | | | |
|---|---|---|---|
| 2,461,190 | 2/1949 | Wolff | 248/180 |
| 2,873,936 | 2/1959 | Baur | 248/180 |
| 3,428,915 | 2/1969 | Leone et al. | 248/487 X |
| 3,436,050 | 4/1969 | Tibbals | 248/487 |
| 3,596,863 | 8/1971 | Kaspareck | 248/487 X |
| 3,814,365 | 6/1974 | Mackenzie | 248/487 X |
| 3,953,113 | 4/1976 | Shull | 248/476 X |
| 4,054,119 | 10/1977 | Hansen et al. | 248/274 X |
| 4,060,315 | 11/1977 | Heinz | 248/487 X |
| 4,278,031 | 7/1981 | Dangschat | 248/180 X |

Primary Examiner—William H. Schultz
Attorney, Agent, or Firm—Laurence J. Marhoefer

[57] ABSTRACT

A stable alignment mechanism for laser mirrors has a resilient diaphragm integrally formed between a base and a support for the laser mirror. An adjusting screw or screws rotate the support with respect to the base to align the mirror.

7 Claims, 2 Drawing Figures

STABLE ALIGNMENT MECHANISM FOR LASER MIRRORS

The government has rights in this invention pursuant to Contract No. DAAK70-79-C-0225 awarded by USA MERADCOM.

BACKGROUND OF THE INVENTION

This invention relates to apparatus for precisely and stably aligning a surface, and more particularly to an improved apparatus for precisely aligning optical surfaces such as, for example, a reflecting surface of a gas laser. While my invention is not necessarily limited to laser applications, it is particularly well suited therefore, and the specific embodiment of my invention will be described in this context.

In the prior art there are a large number of methods and apparatus for aligning optical surfaces. In general, it is relatively easy to provide coarse alignment. But it is relatively difficult to precisely align a surface, such as the reflective surface in a gas laser. Such applications require a very high precision—on the order of 2 arc seconds—along two mutually perpendicular axes.

Prior art in alignment mechanisms of the class contemplated by this invention usually are an assembly of multiple piece parts, and frequently have two or three pivots about which the surface to be aligned is rotated and several loosely constrained springs to hold the surface against some adjustable stops. In such prior art the aligned surface experiences minute angular and translational motions and uncertainties, due to relative motions between the parts in the assembly when the assembly is adjusted or when external vibrations are experienced. The object of this invention is to provide a relatively simple, sensitive and stable apparatus for angularly aligning a surface with respect to another surface.

SUMMARY OF THE INVENTION

Briefly, this invention contemplates the provision of a unitary mounting mechanism in which an integral flexible diaphragm secures a rigid surface support to a rigid base. Alignment adjusting screws into the base and engage a flange secured to the support in order to tip the mount and align the surface.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
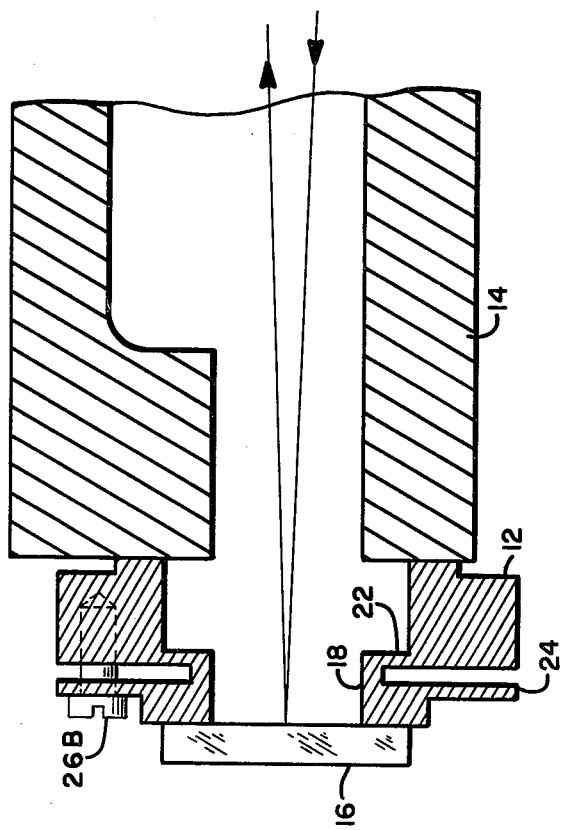
FIG. 1 is a partial sectional side view of a stable alignment mechanism in accordance with the teaching of this invention used to align the reflecting mirror in a gas laser apparatus. The section is taken along the line 1—1 in FIG. 2.

Referring now to FIG. 1 of the drawings, an aligning mechanism in accordance with this invention has a rigid base 12 connected to a tube 14 which, in the illustrated embodiment, is the housing of a CO2 gas laser. Typically the CO2 laser tube 14 is made of a ceramic material, and the unitary mounting is made of a suitable metallic material, such as stainless steel or Dnvar. The base 12 is immovably fixed to the tube 14 by any suitable means known in the art, such as an epoxy.

Similarly a suitable epoxy bonds a reflector 16 to the top of a rigid support 18. It will be appreciated that the base and support are cylindrical, and are axially aligned with the bore of the tube 14. A relatively thin ring shaped circular diaphragm 22 integrally formed with the base 12 and the support 18 resiliently joins the support of the base.

Figure 2:
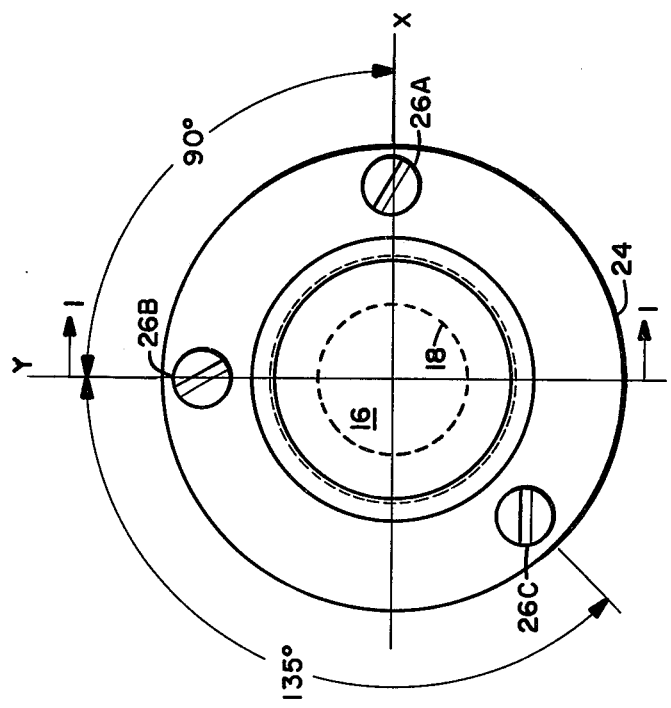
FIG. 2 is an end view of the apparatus as shown in FIG. 1.

A flange 24 affixed to the support 18, and preferably integral therewith, extends out over the base 12. Referring now to FIG. 2 in addition to FIG. 1, the base 12 is drilled and tapped to receive three alignment adjusting screws, 26A, 26B, and 26C. Corresponding holes are formed in the flange 24 so that the heads of the adjusting screws engage the surface of the flange 24 as the adjusting screws are screwed into the base 12.

The adjusting screws 26A and 26B are positioned 90 degrees apart. These adjusting screws provide for adjustment of the support in two orthogonal planes. Adjustment of the screw 26A rotates the support 16 about an axis (designated here for convenience as the Y axis) in the plane of the ring diaphragm 22 and which passes through a point at the center of the ring diaphragm 22. Similarly, adjustment of the screw 26B rotates the support about an axis designated in FIG. 2 as the X axis, which is also in the plane of the diaphragm 22 and passes through a point at the center of the diaphragm 22.

The third adjusting screw 26C is preferably located equidistant from the screws 26A and 26B, or 135 degrees from each. It should be noted that the adjusting screws 26A and 26B provide for an aligning adjustment in only one direction about their respective axes. Tightening the screw 26C into the base 12 deflects the support 18 about both the X and Y axes in a direction opposite to the direction of adjustment provided by screws 26A and 26B. Thus, in operation, the adjusting screw 26C can be used to position the support and the reflector within the range of adjusting operation of the screws 26A and 26B.

It should be noted, that in the preferred embodiment of the invention the thickness of the flange 24 is approximately equal to the thickness of the diaphragm 22 which connects the support and base. However, since the adjusting screws act near the periphery of the flange there is a mechanical advantage due to the lever arm of the flange, and the apparent stiffness of the diaphragm is therefore less than the apparent stiffness of the flange. The sensitivity of the adjustment is a function of this ratio, and in one practical embodiment of the invention, the diaphragm is approximately five times stiffer than the flange. Thus, for example, an adjusting screw with 100 threads per inch provides approximately 60 arc seconds per quarter turn, but the rotation of the support and the laser reflecting mirror on it is only approximately 12 arc seconds. Most of the travel of the adjusting screw is taken up in deflection of the flange 24, and only a part of the adjusting screw travel is taken up in deflection of the ring diaphragm 22.

Those skilled in the art will recognize that only preferred embodiments of the present invention are disclosed herein and that the embodiment may be altered and modified without departing from the true spirit and scope of the invention as defined in the accompanying claims.

What is claimed is:

1. A stable alignment mechanism comprising in combination;
   a base,
   a support for supporting an optical element having a surface which is to be aligned with respect to a predetermined axis,
   a flange secured to said support,
   an adjusting screw engaging said flange and said base,
   a resilient diaphragm coupling said base to said support and integral therewith, said diaphragm oriented to bend in a direction generally parallel to said axis of alignment in response to rotation of said screw whereby said support moves relative to said base.

2. A stable alignment mechanism as in claim 1 further including a second adjusting screw engaging said flange and said base, said second adjusting screws displaced 90 degrees around the periphery of said flange from said first mentioned adjusting screw.

3. A stable alignment mechanism as in claim 1 further including a third adjusting screw engaging said flange and said base, said third adjusting screw located equidistant from said two previously mentioned adjusting screws.

4. A stable alignment mechanism as in claim 1 wherein the stiffness of said flange in operation is less than the stiffness of said diaphragm.

5. A stable alignment mechanism as in claim 2 wherein the stiffness of said flange in operation is less than the stiffness of said diaphragm.

6. A stable alignment mechanism as in claim 2 wherein the stiffness of said flange in operation is less than the stiffness of said diaphragm.

7. A stable alignment mechanism as in claim 1 wherein said diaphragm lies in a plane generally parallel to the plane of said surface.

* * * * *

UNITED STATES PATENT OFFICE
CERTIFICATE OF CORRECTION

PATENT NO. : 4,448,385
DATED : May 15, 1984
INVENTOR(S) : ROBERT J. MATTHYS

It is certified that error appears in the above-identified patent and that said Letters Patent are hereby corrected as shown below:

Claim 6, line 14, cancel "2" and substitute --3--.

Signed and Sealed this

Eighteenth Day of September 1984

[SEAL]

Attest:

GERALD J. MOSSINGHOFF

Attesting Officer

Commissioner of Patents and Trademarks